(12) United States Patent
Djorup

(10) Patent No.: US 6,531,967 B2
(45) Date of Patent: Mar. 11, 2003

(54) AIRCRAFT DISTURBED AIR DIRECT SENSING SYSTEM

(76) Inventor: Robert S. Djorup, 59 High St. Extension, Natick, MA (US) 01760-4933

( * ) Notice: Subject to any disclaimer, the term of this patent is extended or adjusted under 35 U.S.C. 154(b) by 0 days.

(21) Appl. No.: 09/859,052

(22) Filed: May 16, 2001

(65) Prior Publication Data

US 2002/0171563 A1 Nov. 21, 2002

(51) Int. Cl.[7] ................................................ G08G 5/00
(52) U.S. Cl. ................ 340/949; 73/170.02; 73/170.11; 73/170.14; 340/968; 701/7
(58) Field of Search ................... 340/949, 968, 340/969, 963; 73/170.01, 170.02, 170.11, 170.12, 170.14, 189, 204.14, 204.21, 861.65, 861.85; 701/7, 14

(56) References Cited

U.S. PATENT DOCUMENTS

| 4,649,387 A | * | 3/1987 | Maris | 340/966 |
|---|---|---|---|---|
| 4,727,751 A | * | 3/1988 | Holmes et al. | 73/178 R |
| 4,920,793 A | * | 5/1990 | Djorup | 73/204.14 |
| RE34,082 E | * | 9/1992 | Greene | 340/968 |
| 5,639,964 A | * | 6/1997 | Djorup | 73/170.12 |
| 6,134,958 A | * | 10/2000 | Djorup | 73/170.12 |
| 6,230,570 B1 | * | 5/2001 | Clark et al. | 73/861.06 |

* cited by examiner

Primary Examiner—Brent A. Swarthout
(74) Attorney, Agent, or Firm—Choate, Hall & Stewart

(57) ABSTRACT

Airspeed direct sensing transducer apparatus in a system where fast response gust sensors are aircraft wing mounted, each gust sensor mounted on opposite wing halves feeding the absolute value of low-pass filtered direct sensed airstream gust cross-component signals to a difference amplifier providing an electrical indication when one side of the aircraft "sees" disturbed or turbulent air as may be encountered when an aircraft trailing wake-vortex or similar hazardous atmospheric disturbance is approached. This enables the pilot to take evasive action to mitigate or avoid the turbulence disturbance, enhancing free flight aircraft operation.

1 Claim, 2 Drawing Sheets

Sample Reconstructed TURBULENCE EVENT

AIRCRAFT DISTURBED AIR DIRECT SENSING SYSTEM

TECHNICAL FIELD

The invention relates generally to an improved aircraft flight instrument sensor that can be used to mitigate or avoid encounters with turbulent or hazardous airflow during routine aircraft flight operations. Direct sensing of a specific component of total measured airspeed is accomplished, taken from instantaneous longitudinal airspeed, mean airspeed, total turbulence, and turbulent cross-components, thus a particular hazardous component is directly sensed, rejecting all other airstream variations. Knowledge of the disturbed air condition to either side of the aircraft is made available to the pilot. The approach is not complex, uses no moving parts, is economical and is easily installed.

BACKGROUND ART

Most, if not all, measurements of the airstream from operating aircraft are done by transducers mounted near the fuselage nose or on the vertical fin, as opposed to out on the wing. Among the usual parameters, such as total pressure or impact pressure, static pressure, total temperature, angle-of-attack, and the like, angle-of-attack can be used to determine the vertical component of impinging airflow. Many angle-of-attack transducers are electromechanical in design and U.S. Pat. No. 3,077,773 presents an overview of the measurement together with angle-of-attack and yaw-angle computation. A combination of electromechanical attitude sensing vanes with pitot-static pressure sensing for both airstream incidence angle and airspeed measurement is taught by U.S. Pat. No. 4,184,149. Aircraft meta-center (center of motion) mounted accelerometers are customarily used to determine three-dimensional accelerations of the aircraft from which indirect determinations of impinging air mass motion may be computed. Such indirect sensing is limited by the narrow bandwidths involved and by airframe non-linear responses to dynamic airstream inputs. Disturbance threshold low energy level skirt signals are simply not able to be measured because of the limited dynamic range of meta-center located instrumentation and airstream input forcing function modification by the flexible airframe, suggesting that many of the published data respecting turbulence encounters may be understated as a result of input signal attenuation by the airframe itself. Little has been done respecting fast response direct sensing and differential measurement across the wingspan since USAF "Project Jet Stream" in the 1950's and early 1960's, a program to detect jet stream location from an aircraft. The advent of the highly successful "TIROS" observational satellites effectively ended all aircraft direct sensing activities by the Government and by the world-wide aviation community. It is subsequently taught in U.S. Pat. No. 5,639,964 that a pair of wing-tip mounted turbulence sensors can determine sharp energy gradients, information which may be useful to the pilot in turbulence avoidance. Sensitive fast response airspeed gust component transducers of the thermal anemometer type disclosed by U.S. Pat. No. 6,134,958 can be used to detect near-instantaneous airstream disturbances.

When a disturbance is encountered head-on by an aircraft the result is usually a sharp jolt or pronounced bounce. If a disturbance is initially encountered by a wing-tip the result can be a hazardous rolling-moment. It is notable that in-trail wake-vortex encounters at altitudes up through cruising altitudes can result in forces sufficient to induce unwanted aircraft roll into the direction of the encounter. It has been observed and reported by NASA Ames Research Center ("Overview of Wake-Vortex Hazards During Cruise" by V. J. Rossow and K. D. James, AIAA Paper No. 99-3197) that certain aircraft upsets earlier thought to be caused by clear air turbulence may actually have been encounters with persisting jet aircraft wake-vortices. Their conclusion suggests that all aircraft flight paths could be computer-stored in real time and their tracks, with trailing wake-vortex positions, made available on demand to any other aircraft to facilitate avoidance. Such an approach can be cumbersome and quite costly. The instant invention discloses an easily installed low-cost approach that provides the pilot with immediate knowledge of the energy condition of the local air mass through which he is flying. Pilot awareness of his aircraft's approach to a disturbance through its threshold skirt region can enable him to take appropriate evasive action to mitigate the effect of the disturbance encounter.

SUMMARY OF THE INVENTION

The instant invention discloses an improved combination of airspeed transducer apparatus to form a system where a pair of near-identical sensitive fast-response airspeed gust component transducers is mounted symmetrically, left and right, on or suspended from an aircraft's wing, each gust sensor feeding the absolute-value of low-pass filtered sensed airstream gust cross-component signals to a difference amplifier. The difference amplifier provides an electrical indication when one side of the aircraft "sees" disturbed or turbulent air as may be encountered when an aircraft trailing wake-vortex is approached. When both wingtips simultaneously "see" the same disturbed air mass the difference amplifier output signal is nil or zero. As step function changes do not exist in the atmosphere, atmospheric disturbances are surrounded by a threshold region with diminishing energy skirts as you move away from the disturbance. When a wing-tip encounters the skirt region or threshold region of disturbed air the difference output signal will increase, identifying the left or right wing-tip first entering the disturbed air.

When seeking a turbulence component the taking of differences between large longitudinal airspeed values is difficult at best. The thermal anemometer double-element sub-bridge rejects longitudinal or mean airspeed, seen as a common-mode signal, allowing us to look only at the desired instantaneous gust cross-component. The desired component, vertical or horizontal, is determined by airspeed transducer axial orientation as described by U.S. Pat. No. 6,134,958. A turbulent airspeed cross-component is generally bipolar and wing tip-to-tip differences are more readily determined when the cross-component signal is rectified by an absolute-value amplifier. This enables the taking of differences between like polarity signals. Since both airspeed component measurement transducers must be as near-identical as possible, a low-pass filter is placed before the absolute-value stage to control signal bandwidth. This assures similar transducer-to-transducer turbulent energy frequency response. Turbulence frequency range of interest is taught by U.S. Pat. No. 5,639,964. It is important that the wing-tip mounted gust sensor follows rapid turbulent airspeed variations as they occur.

Processing the turbulent or gust component signals in this manner uses the least number of electrical parts. The stages through the absolute-value amplifier stage can all be contained within the transducer support housing itself. The output signal, taken to the difference amplifier which may be located in the fuselage, is a low-source-impedance high-level signal. Alternatively, each wing-tip transducer can contain the system output difference amplifier, only one of which will be actively used, keeping all transducers interchangeable, both physically and electrically. This eliminates the need for a separate physical housing for the difference amplifier.

Use of one transducer per wing half is shown. It should be noted that additional transducers can be added to each wing half provided that symmetry is maintained from side to side. Distribution of an array of transducers along the wing span facilitates profiling and identification of the disturbance type from wing-tip to wing-tip. Their outputs can be summed or added together prior to further signal processing as herein disclosed. In this manner some control can be introduced respecting the scale of sensed disturbance that is detected.

BEST MODE OF CARRYING OUT THE INVENTION

Figure 1:
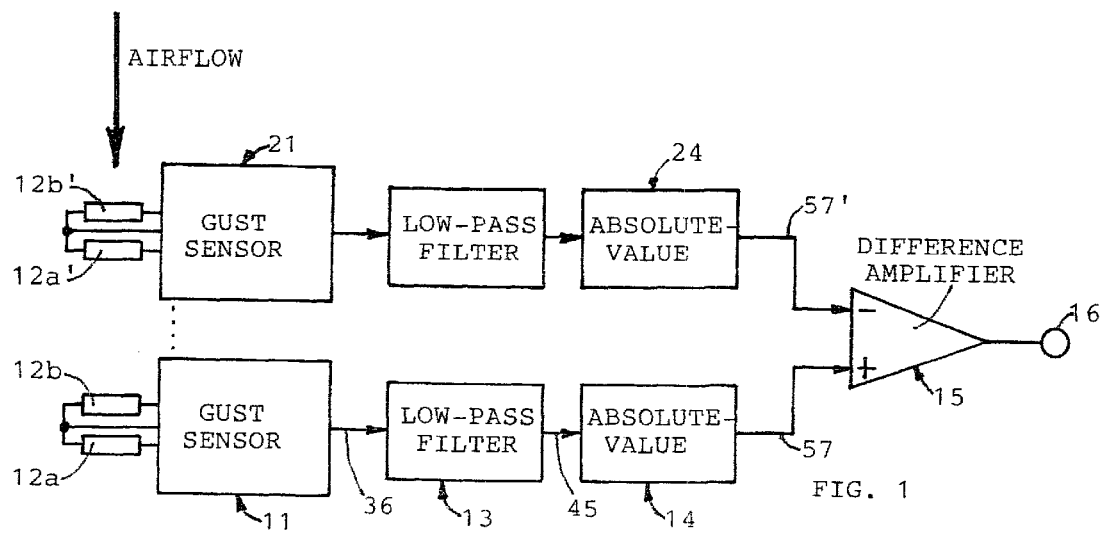
FIG. 1 is a block diagram of an aircraft disturbed air direct sensing system made in accordance with the principles of the present invention.

Referring now to the drawing, and in particular to FIG. 1, a block diagram of an aircraft disturbed air direct sensing system is shown, made in accordance with the principles of the present invention. The airflow input thermal anemometer aircraft airspeed gust component transducers, noted here more simply as gust sensor 11 and 21, are as like each other as possible so that airflow disturbances may be detected when wing-tip to wing-tip airflow differences are at extremely low amplitudes. Both wing-tip mounted transducers with signal processing are the same in all respects. Impinging airflow is across sensing element pair 12a and 12b and pair 12a' and 12b', the active thermal anemometer sensing elements in gust sensors 11 and 21. Gust sensor 11 cross-component output 36 is bandwidth controlled by low-pass filter 13 to reduce noise pickup and unwanted signals beyond the frequency band of interest. Filter 13 output 45 is fed into absolute-value amplifier 14 which provides a unipolar output signal 57 as one of the two inputs to difference amplifier 15. The second input, 57', is the similarly processed signal taken from gust sensor 21. Both input signals 57 and 57', fed to difference amplifier 15, are the same polarity at all times. When one input signal increases in magnitude, more than the other, an output appears at 16. Output signal 16 polarity identifies the wing-tip gust sensor, 11 or 21, sensing disturbed air. If both absolute-value signals 57 and 57' are the same magnitude, the output 16 will be zero. Assuming that both absolute-value amplifiers, 14 and 24, are connected to provide a positive-going output 57 and 57', a larger amplitude signal at 57 will produce a positive-going output 16 from difference amplifier 15, and a larger amplitude signal at 57' will produce a negative-going output 16 effectively identifying which wing-tip first enters disturbed air. System sensitivity can be set by the gain chosen for output difference amplifier 15.

Figure 2:
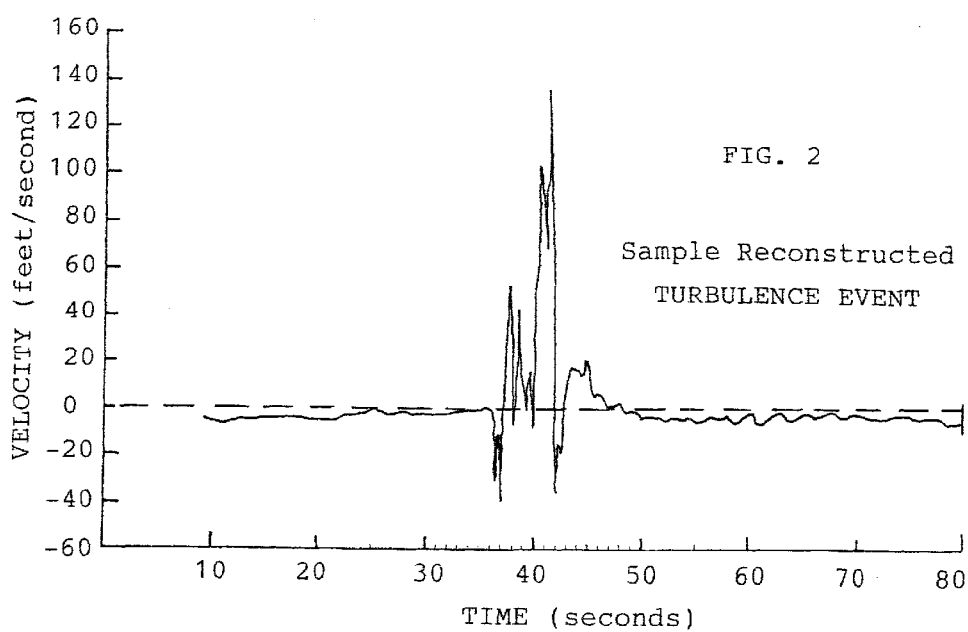
FIG. 2 illustrates a turbulence sample reconstruction of the type of disturbed air able to be sensed by the present invention.

FIG. 2 is a graphical illustration of a sample reconstructed turbulence event measured by a vertical accelerometer located at the center of motion of a heavy jet aircraft. The integrated accelerometer output is shown indicating the vertical velocity airflow experienced by the aircraft at cruising airspeed, flying from right to left. The shape of the velocity profile is what may be expected when an aircraft passes directly through a jet aircraft wake-vortex. For flight perpendicular to the disturbance axis or wake-vortex core the low-energy skirt regions extend some ten to fifteen seconds to either side of the disturbance for an aircraft at cruising airspeed. If the aircraft is flying in-trail, or at an acute angle to the disturbance core, the skirt time duration can be considerably longer. As a hypothetical example, assume that an aircraft vortex-wake is to the left and one's aircraft is in-trail or flying at an acute angle to the wake's axis. After flying through an increasing energy skirt or turbulent threshold region alongside the wake, the left wing-tip enters an intense updraft, tip stall and left wing section stall then occurs as a direct result of the encountered very high instantaneous angle-of-attack. Resulting loss of lift at the left wing half causes a gravity induced drop of the left wing-tip, starting roll of the aircraft. The downdraft component of the wake-vortex "W"-like cross-section is entered, further increasing the roll. Aircraft controls, ailerons and rudder, are not sufficient to counteract or correct the roll. A left engine burst of power could be used to assist recovery. Pilot knowledge of tip-to-tip vertical component velocity differences can be used to avoid a direct wake encounter if immediate evasive action is taken to sharply turn away from a detected vertical component increase that does not appear simultaneously at both wing-tips. Such pilot knowledge can be of particular importance during periods of free flight operations.

Figure 3:
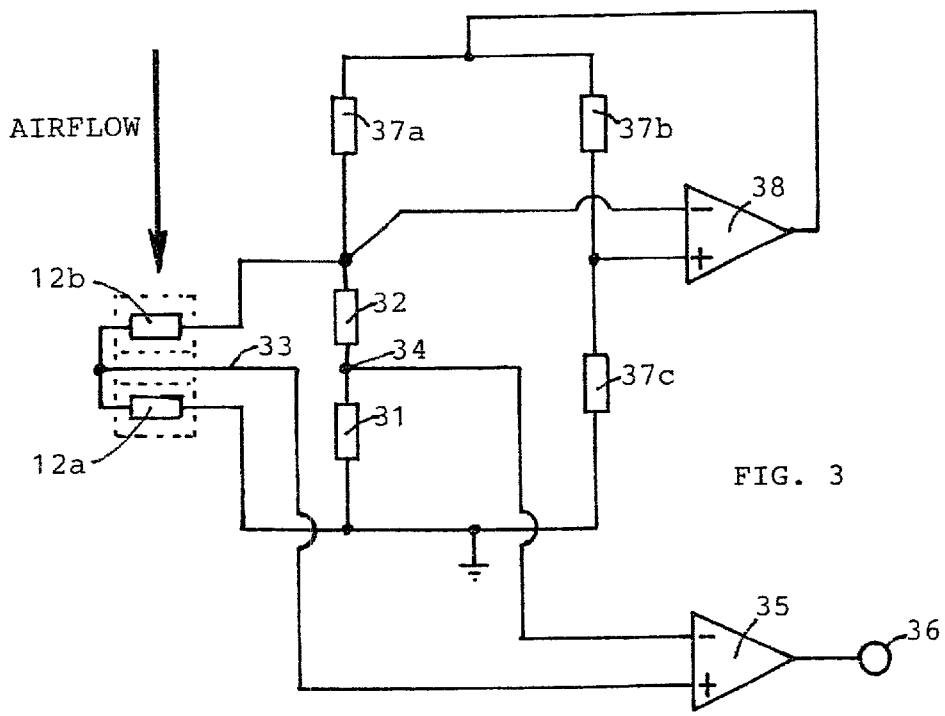
FIG. 3 is a simplified schematic drawing of a thermal anemometer aircraft airspeed gust component transducer.

FIG. 3 is a simplified schematic drawing of a thermal anemometer aircraft airspeed gust component transducer well suited for use by the instant sensing system. Self-heated sensing elements 12a and 12b are exposed to incident airflow and they are electrically connected across resistors 31 and 32, forming a Wheatstone bridge or component bridge serving as one arm of a second Wheatstone bridge. The second bridge is formed by resistors 37a, 37b, and 37c together with the component bridge. Amplifier 38 supplies excitation power to both bridges. Airflow cooling induced imbalance of the heat loss from elements 12a and 12b is determined as the cross-component signal, between points 33 and 34, which feeds into differential amplifier 35 providing a cross-component output 36. Two signals can be taken from the component bridge. These are the sum and difference signals seen by the sensing element pair 12a and 12b. The sum signal, taken across the series combination of 12a and 12b, provides instantaneous airspeed and contains total turbulence and cross-component signals as well as mean longitudinal airspeed. The difference signal, taken from the mid-point 33 of the series-connected sensing elements 12a and 12b to the mid-point connection 34 of bridge balancing resistors 31 and 32, is the cross-component signal of interest. The sum signal feeds both sides of the component bridge and is rejected as a common-mode signal seen by both input sides of differential amplifier 35, effectively eliminating all airflow input signals not of interest. Cross-component signal level is established by the gain of amplifier stage 35. The transducer design has a dynamic range considerably greater than 10,000 to 1. A detailed description of gust component transducer construction and design is taught by U.S. Pat. No. 6,134,958.

Figure 4:
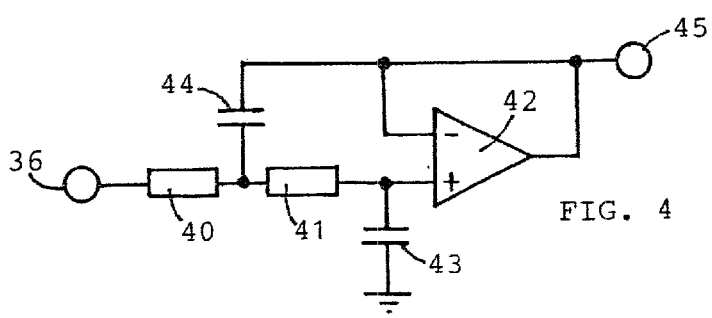
FIG. 4 is a simplified electrical circuit schematic drawing of an active low-pass filter.

FIG. 4 is an electrical circuit diagram for a unity-gain active low-pass filter of the Sallen-Key type, a two timeconstant design with a roll-off of −12 dB per octave above the cutoff frequency. Cutoff frequency F equals 1/(2 pi RC), where R is in ohms and C is in Farads. Resistor 40 is equal to resistor 41 and each is equal to the value of R used in calculating the cutoff frequency. Capacitor 44 is equal to 1.414C and capacitor 43 is equal to 0.707C. Operational amplifier 42 is connected for unity gain with output 45 following input 36, subject to the chosen filter roll-off characteristic.

Figure 5:
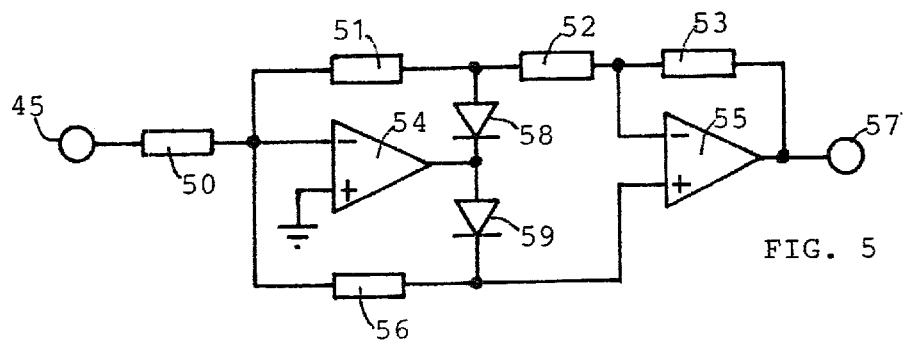
FIG. 5 is a simplified electrical circuit schematic drawing of an absolute-value amplifier.

FIG. 5 is an electrical circuit diagram for an absolute value amplifier which is basically a precision full-wave rectifier. With the electrical components connected as shown, a bipolar input signal at 45 will provide a unipolar output signal at 57 without loss of any portion of the input signal. Resistors 50, 51, 52, 53 and 56 are all the same value and 10,000 ohms is typical for such a circuit when unity gain is desired. Operational amplifiers 54 and 55 are conventional integrated circuit devices. Signal diodes 58 and 59 perform precision signal rectification inside the amplifier 54 feedback loop. Output polarity at 57 can be reversed by reversing the connection of both signal diodes 58 and 59.

System signal gain for the detected turbulent airspeed gust cross-component is most easily established by setting the gain of amplifier 35 in the circuit of FIG. 3. It can be reasoned that the turbulence frequencies of most interest lie below 10 cycles per second. Selection of such frequencies is taught by U.S. Pat. No. 5,639,964, where airspeed, space resolution wavelength, and frequency bandwidth selection relevant to aircraft are considered.

Although the embodiment disclosed in carrying out the invention describes an analog approach, it is understood that each airspeed gust component transducer output signal may be sampled and digitized, with subsequent mathematical operations of filtering, absolute-value taking or signal rectification, and difference determination being accomplished by digital computation means.

The above description presents the best mode contemplated in carrying out the invention. The invention is, however, susceptible to modifications and alternate constructions from the embodiment shown in the drawing and described above. Consequently, it is not the intention to limit the invention to the particular embodiments disclosed. On the contrary, the invention is intended and shall cover all modifications, arrangements and alternate constructions falling within the spirit and scope of the invention, as expressed in the appended claims when read in the light of the description and drawing.

What is claimed is:

1. A thermal anemometer air stream energy sensor comprising:

thermal anemometer aircraft airspeed transducer means providing an electrical output signal representing instantaneous velocity of direct air stream flow against said transducer means;

said electrical output signal being capacitance coupled to an absolute-value amplifier circuit means performing signal rectification and signal amplification;

said absolute-value amplifier circuit means being frequency response and bandwidth limited by a low-pass filter capacitor means operatively connected across feedback resistance within said absolute-value amplifier circuit; and the combination of said thermal anemometer aircraft airspeed transducer means with said absolute-value amplifier circuit means thereby producing a bandwidth controlled unipolar measurement of thermal anemometer direct sensed air stream energy.

* * * * *